Feb. 22, 1938. E. B. WILFORD ET AL 2,108,839
AIRCRAFT
Filed Jan. 3, 1935 2 Sheets-Sheet 1

INVENTORS
EDWARD BURKE WILFORD
ELLIOT DALAND
BY Frank H Borden
ATTORNEYS.

Feb. 22, 1938. E. B. WILFORD ET AL 2,108,839
AIRCRAFT
Filed Jan. 3, 1935 2 Sheets-Sheet 2

INVENTORS
EDWARD BURKE WILFORD
ELLIOT DALAND
BY Frank H Borden
ATTORNEYS.

Patented Feb. 22, 1938

2,108,839

UNITED STATES PATENT OFFICE 2,108,839

AIRCRAFT

Edward Burke Wilford, Merion, and Elliot Daland, Philadelphia, Pa.

Application January 3, 1935, Serial No. 206

2 Claims. (Cl. 244—18)

This invention relates to aircraft, and particularly to improvements in a normally aerodynamically driven rotary wing both as to blade design and control.

An object of this invention is to combine the fixed wing element with the center portion of the rotor, not only to fair the hub, but to give the rotor a better lift drag ratio in forward flight.

Another purpose of the invention is to divide the blade into an outer portion which is movable, being feathered or articulated, and an inner portion which is solid and fastened rigidly to the rotor hub. An advantage of this is that the rotor system can be made lighter, and the part which is movable, can be made much smaller, and therefore lighter, which will improve the flying qualities of the machine, due to the fact that the inertia of the parts which have to be moved during each rotation of the blade is considerably cut down, making it easier to get the rotor running smoothly.

These and many other advantages will be clearly understood by referring to the drawings in which.

Figures 1, 2:
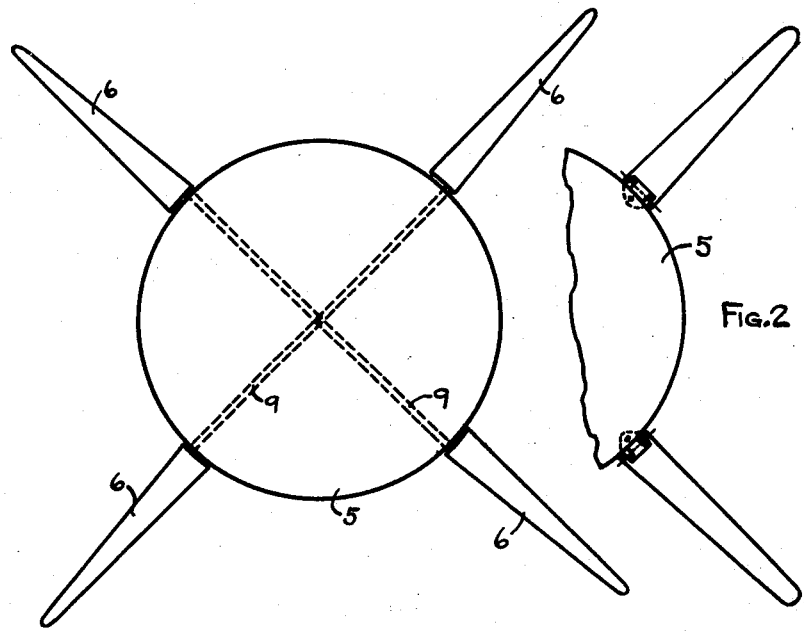
Fig. 1 is a top or plan view of the rotor used on the aircraft shown in Fig. 2.
Fig. 2 is a top or plan view of a modified form of rotor.
Figure 3:
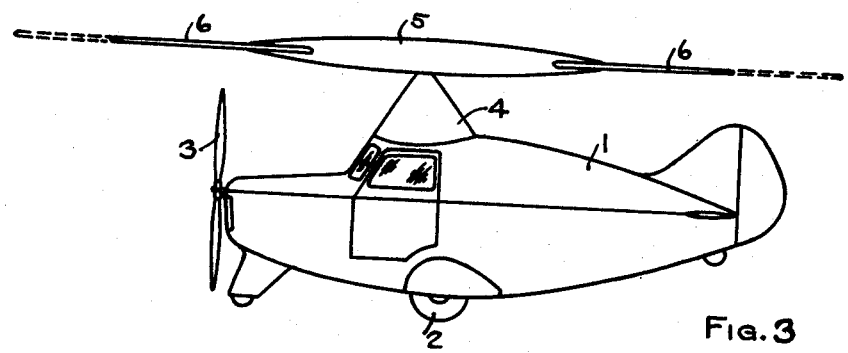
Figure 4:
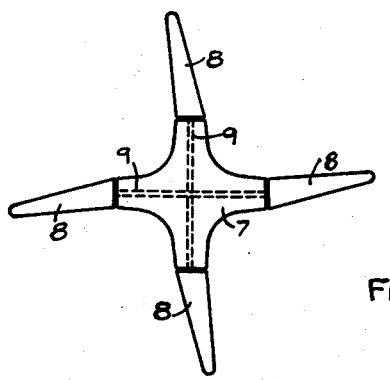
Figure 5:
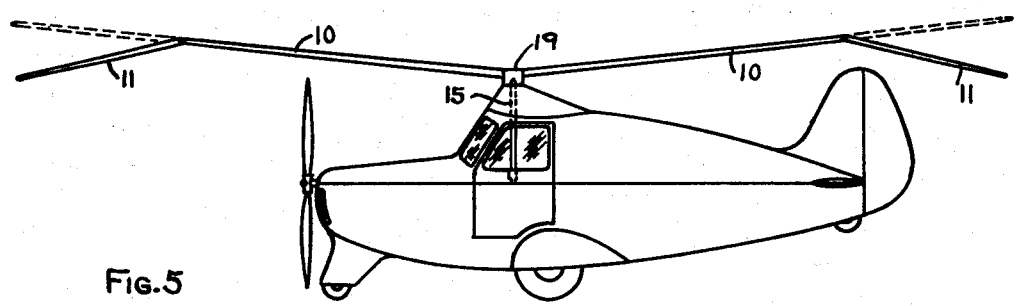
Figure 6:
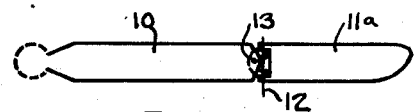
Figure 7:
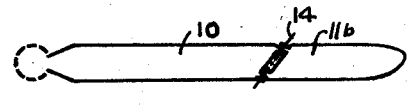
Figure 8:
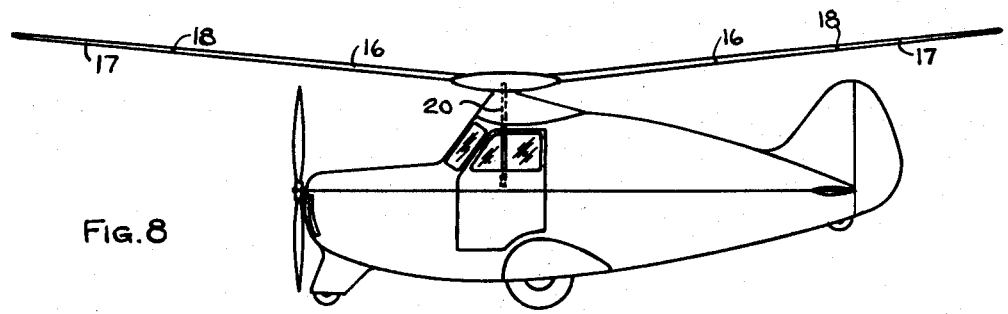
Figure 9:
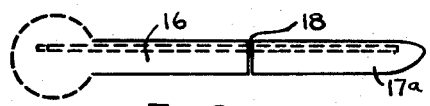
Figure 10:
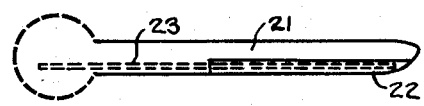

Fig. 3 is a side view of an aircraft which embodies one form of this invention with the path of rotation of the blade shown in dotted lines, Fig. 4 is a top or plan view of an alternate or modified form of rotor adaptable to the aircraft shown in Fig. 2, Fig. 5 is a side view of an aircraft using the hinged form of blade tip of this invention with an illustrative conventionalized two bladed rotor hub, Fig. 6 is a top or plan view of a form of blade which may be used with the aircraft shown in Fig. 5, Fig. 7 is a top or plan view of another modified blade in which the tip is angularly hinged, which may be used by the aircraft shown in Fig. 5, Fig. 8 is a side view of an aircraft using the feathered form of blade tip of this invention with an illustrative conventionalized two bladed rotor hub, Fig. 9 is a top or plan view of a cantilever type of blade which may be used with the aircraft shown in Fig. 8, and Fig. 10 is a top or plan view of a type of blade using ailerons or flaps which can be used with aircraft shown in Fig. 8.

Referring to Fig. 2. The body 1 is supported when on the ground by wheels 2 and moved forward by propeller 3 driven by the engine. The pylon 4 supports the rotor, which in this form of the invention, consists of a central disc 5 with a plurality of blades 6 extending substantially radially from its edge. Each blade 6 is provided with an inwardly extending shaft 9 which is mounted in two bearings contained within the disc 5 so that it can be feathered or turned through a small angle about its longitudinal axis.

The previous forms of normally aerodynamically driven rotary wing aircraft have had their blades extending practically into the center of rotation, and since, in the vicinity of such center the velocities due to rotation are low, no lift of any importance was obtained by this inner portion of the blades. Furthermore, due to the low velocity and lift the air velocity passing upward through the disc was greatest at this point and tended to fill in the region of diminished pressure which was created by the outer part of the blades and thus to diminish the lift due to that region.

The solid disc center of appreciable area of this invention, as shown, for instance, in the disclosure in Figs. 1 and 2, has many important aerodynamic advantages.

First, it seals off the center of the disc where the excessive upward flow of air occurs.

Second, it thereby prevents the leakage of air into the region of low pressure above the outer portions of the blade and hence increases the lift and efficiency of the outer portion.

Third, it streamlines the hub and affords a fairing for any bracing which may be used to make the center portion of the structure stiffer and lighter.

Fourth, it is of such diameter as to provide enough length between its center and the rim of the disc 5 that the blades can be mounted independently, with reasonably small forces on the bearings.

Fifth, it provides a fixed surface on which the aircraft can help support itself after sufficient speed has been attained, thus allowing the blades to be somewhat unloaded and to slow down in their revolutions, and therefore to offer much less resistance to forward progress.

The center disc 5 may be constructed of sheet metal, plywood, fiber or other sheet material or of ribs and doped cloth. Its section should be as streamlined as possible and may or may not be symmetrical.

The blades 6 are similar to other blades used in cantilever gyros and may be of any of the forms disclosed in an application of Daland and Herzog, filed of even date herewith, except that they are preferably shorter and have much less weight because the heavier inner portion of past constructions is not required. They are preferably and illustratively intended to be feathered, i. e., the angle of incidence varied slightly during the revolution so as to provide equality of lift or desired manual control. The blades, however, alternatively may be hinged to the enlarged central disc 5 at any angle and control may be obtained by rocking the whole assembly, as in Fig. 2.

Fig. 4 represents an alternate or modified form of this invention. The center star section 7 is not round as in Fig. 1 but is shaped to accommodate the number of blades used.

It has less area than the central solid disc 5 in Fig. 1, and so cannot generally be used to support the gyroplane in the high speed condition, but it has all the other advantages of Fig. 1 and is somewhat lighter. The blades 8 are similar to blades 6 of Fig. 1 and have the same advantages.

The construction of star central section 7 may be similar to that used in disc 5, Fig. 1. The blades 8 may also be hinged so that they flap to correct lift differences, the control being obtained by rocking the axis.

Fig. 5 represents a typical aircraft using another form of this invention. All the features of the craft except the rotor are conventional for a gyroplane. The rotor consists of a plurality of blades 10 and 11. The inner part of each blade 10 is fixed to the rotating hub 19 and does not flap or feather. The outer portion 11 is hinged by connected hinge 12 to portion 10 and in flight it takes up a position which is determined by the balance of the forces of lift and acceleration.

The top view of this blade, Fig. 6, shows that the axis of hinge 12 may be substantially at right angles to the longitudinal axis of the blade.

In addition to the horizontal hinge 12 a vertical hinge 13 may or may not be used. The purpose of the pin 13 is to allow the blade to assume a position in the plan which is a balance.

An alternate form, Fig. 7, shows the hinge axis 14 forming an oblique angle with the longitudinal axis of the blade. The position of the hinge of Figs. 6 and 7 along the blade may be substantially at any point throughout the blade length, but preferably lies between 10% and 60% of the radius. A study of the used distribution of lift on a rotor blade shows that by far the greater part of the lift derived is from the outer half of the blade. Therefore, the equalizing of the lifts on opposite sides of the rotor when a forward velocity occurs, is easily accomplished by the flapping of the small outer portion only. This has the advantage of reducing the weight and therefore the inertia of the flapping element. The angular disposition of the hinge shown in Fig. 7 forces the blade to change its angle of incidence as it flaps so that the amplitude of the flapping is much reduced.

The inner portion 10 may be attached to the hub at a small dihedral angle (as shown), a feature which tends to reduce the bending moments in the inner blade structure 10. The part 10 may also be attached to the hub without dihedral but with sufficient flexibility so that under load it deflects upward to a point where a portion of the load is carried by the tension of centrifugal force, or in other words until a part of the moment is counteracted by a reverse moment composed of deflection times centrifugal force.

The control of this aircraft may be accomplished by tilting the hub and axis of rotation through a small angle in any desired direction. This result is obtained by the stick or lever 15, or the like, which is moved by the pilot's hand through linkages and joints (not shown) to give the proper direction and amount.

Fig. 8 is a side view of an aircraft using still another form of this invention. In this form (as shown in the previous form in Fig. 7) the inner portion of the rotor blade is fixed rigidly to the hub so that it neither flaps nor feathers. The part 17, Fig. 8, and part 17a, Fig. 9, is attached to fixed blade part 16 by means of a projecting axial member 18 which is attached rigidly to 17a and is journaled in fixed blade part 16 so that the incidence of the tip portion 17a can be changed. Associated with this rotor is a hub of the kind used in cantilever gyroplanes arranged for manual control as by stick 20 or the like, through feathering mechanism (not shown).

Fig. 9 is an alternate form of the rotor used in Fig. 8 in that in place of having the whole tip change its incidence, merely a narrow portion 22 near the trailing edge of fixed blade 21 is hinged along its leading edge and is rotated about this axis by the control tube 23 which is operated by the same gyroplane type of hub and manual lever 20 as in the previous case. The advantage of this is that there is no moment but only forces taken through the hinges, and they can therefore be made very light and strong.

The length of the part 16, Figs. 8 and 9, and the distance out from center to the inner end of control tube 23, Fig. 10, may be anything desired, but is preferably between 10% and 60% of the blade radius.

The important advance which underlies all the different forms disclosed herein is that of dividing the blade into two portions so that the inner portion which is moving so slowly that it contributes little to the lift, is made rigid with the hub, and it thereby can be made stronger and lighter. The outer part, which is also the lighter part, is then made to equalize the lifts and/or do the controlling in various ways.

Heretofore all aircraft supported by an aerodynamically driven rotor have had blades which moved as a whole, either flapping or feathering from a point as close to the hub as possible. This disclosure shows the many advantages gained by shortening the movable part of the blades. Of course the step forward in the art by providing the enlarged central disc are of Figs. 1, 2, 3, and 4, whereby the advantages of the auxiliary fixed wing are secured in the rotary wing system itself, and thus enables and facilitates removal of such auxiliary fixed wing as such, are highly important and are deemed to be obvious.

We claim:

1. In an aircraft, a normally aerodynamically driven rotary wing system having a hub and an axis of rotation, a plurality of blades attached to the hub, each blade comprising a stationary inner section of appreciable length and of airfoil section, and a tip section oscillatably mounted on the stationary section for movement relative thereto, on axes both longitudinal and lateral of said blade, the respective tip sections arranged for movement to substantially nullify the moments from the forward velocity of the aircraft.

2. In an autogiro comprising a body with means of forward propulsion, a rotary wing system mounted on the body, the blades of said rotary wing system consisting of an inner fixed portion, tips articulated to the inner fixed portion, said portion and said tip being of airfoil section, and means for tilting the axis of rotation of the wing system to the body.

EDWARD BURKE WILFORD.
ELLIOT DALAND.